US008934895B1

(12) United States Patent
Gunasekara et al.

(10) Patent No.: US 8,934,895 B1
(45) Date of Patent: Jan. 13, 2015

(54) SYSTEM AND METHOD FOR SIGNALING GATEWAY

(75) Inventors: Don Gunasekara, Reston, VA (US);
Yvonne Quy Ha, Vienna, VA (US);
Janet Ruth Dianda, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 2006 days.

(21) Appl. No.: 11/638,400

(22) Filed: Dec. 14, 2006

(51) Int. Cl.
*H04W 4/00* (2009.01)
*H04W 36/00* (2009.01)

(52) U.S. Cl.
USPC ............ 455/433; 455/432.1; 455/435.1; 455/436; 370/331

(58) Field of Classification Search
USPC ............ 455/436, 410–411, 432.1–433, 455/435.1–445, 448–449; 370/331, 338
See application file for complete search history.

(56) References Cited

U.S. PATENT DOCUMENTS

| | | | |
|---|---|---|---|
| 2004/0087307 A1* | 5/2004 | Ibe et al. | 455/436 |
| 2006/0003765 A1* | 1/2006 | Patil et al. | 455/432.1 |
| 2006/0079228 A1* | 4/2006 | Marsico et al. | 455/433 |
| 2006/0079236 A1* | 4/2006 | Del Pino et al. | 455/445 |
| 2006/0114871 A1* | 6/2006 | Buckley et al. | 370/338 |
| 2006/0246903 A1* | 11/2006 | Kong et al. | 455/437 |
| 2006/0258370 A1* | 11/2006 | Sudit et al. | 455/456.1 |
| 2007/0060124 A1* | 3/2007 | Kalavade | 455/433 |
| 2007/0167167 A1* | 7/2007 | Jiang | 455/453 |
| 2008/0058003 A1* | 3/2008 | Rydnell et al. | 455/552.1 |
| 2008/0267199 A1* | 10/2008 | Smith et al. | 370/401 |
| 2009/0122759 A1* | 5/2009 | Kumar et al. | 370/331 |

OTHER PUBLICATIONS

Joint Standard "Network Interworking Between GSM MAP and TIA-41 MAP; Revision B—CDMA2000 Support", J-STD-038-B, Oct. 27, 2004, (with TIA press release as evidence of date.

* cited by examiner

*Primary Examiner* — Michael Mapa

(57) ABSTRACT

Systems and methods for a gateway that couples two or more networks are provided. The gateway allows mobile stations with subscriptions in one network to roam and operate in another network. The networks that can be coupled by the gateway include CDMA-based networks, GSM-based networks, iDEN-based network and WiMAX-based networks.

14 Claims, 12 Drawing Sheets

| Subscriber 1 | | |
|---|---|---|
| Networks | Home Database | Visited Database |
| WiMAX | HSS/AAA_1 | |
| CDMA | HLR | VLR |
| . . . | . . . | . . . |
| iDEN | HLR/iHLR | VLR/DAP |

FIGURE 4

SYSTEM AND METHOD FOR SIGNALING GATEWAY

BACKGROUND OF THE INVENTION

There are currently a number of different standards for wireless communication networks. These standards can cover a variety of aspects of a wireless communication system, such as air interface and core network signaling. Typically, wireless communication networks that operate using different air interface standards also operate using different core network signaling. For example, Global System for Mobile communications (GSM)-based networks use a Time Division Multiple Access (TDMA) air interface and GSM mobile application part (MAP) for core network signaling, whereas most wireless networks that are commonly referred to as Code Division Multiple Access (CDMA)-based networks typically employ a CDMA air interface and International Standard-41 (IS-41) for core network signaling.

The different air interface and core network signaling of GSM-based and CDMA-based networks limits the ability of subscribers from one of these networks to operate on the other network. To address this issue the J-STD-038 standard has been developed by the Telecommunications Industry Association to provide roaming between networks that operate according to these two technologies. This standard provides an inter-working and interoperability function (IIF) that acts as a gateway between a GSM-based and CDMA-based network to interpret signaling messages of one protocol and convert the messages into the protocol of the other network. The IIF must be provisioned with basic subscriber information, such as International Mobile Subscriber Identity (IMSI), Mobile Identification Number (MIN), Electronic Serial Number (ESN), Terminal type, and Network Access Mode (non-GPRS, GPRS or both).

SUMMARY OF THE INVENTION

One problem with the J-STD-038 standard is that it is limited to roaming between GSM and CDMA-based networks. However, there are currently other types of networks in operation, such as iDEN networks, which are not currently supported by the standard. Additionally, GSM- and CDMA-based networks are circuit-switched networks and it would be desirable to support packet-switched networks such as WiMAX-based networks. As wireless network operators upgrade their networks, it is likely that they will simultaneously maintain networks that operate according to different wireless network standards. Moreover, wireless network operators desire the ability to obtain revenue from mobile stations roaming from other wireless networks. Accordingly, it would be desirable to provide systems and methods that allow a mobile station to roam between wireless networks (in addition to GSM- and CDMA-based networks) that operate according to different wireless network standards.

In accordance with exemplary embodiments of the present invention a signaling gateway provides for roaming between networks operating according to different wireless network protocols. The signaling gateway allows roaming between a WiMAX-based network and at least one of a GSM-, CDMA- or iDEN-based network. When a mobile station registers in a particular network, registration requests are sent to the signaling gateway. The signaling gateway handles authentication and registration in both the network that the mobile station is currently being supported and in at least one other network. This other network is the "home" network for the mobile station with which the mobile station maintains a subscription.

Other objects, advantages and novel features of the present invention will become apparent from the following detailed description of the invention when considered in conjunction with the accompanying drawings.

BRIEF DESCRIPTION OF THE DRAWING FIGURES

FIG. 4 is a block diagram of an exemplary subscriber record in accordance with the present invention;

DETAILED DESCRIPTION OF THE PREFERRED EMBODIMENTS

Figure 1:
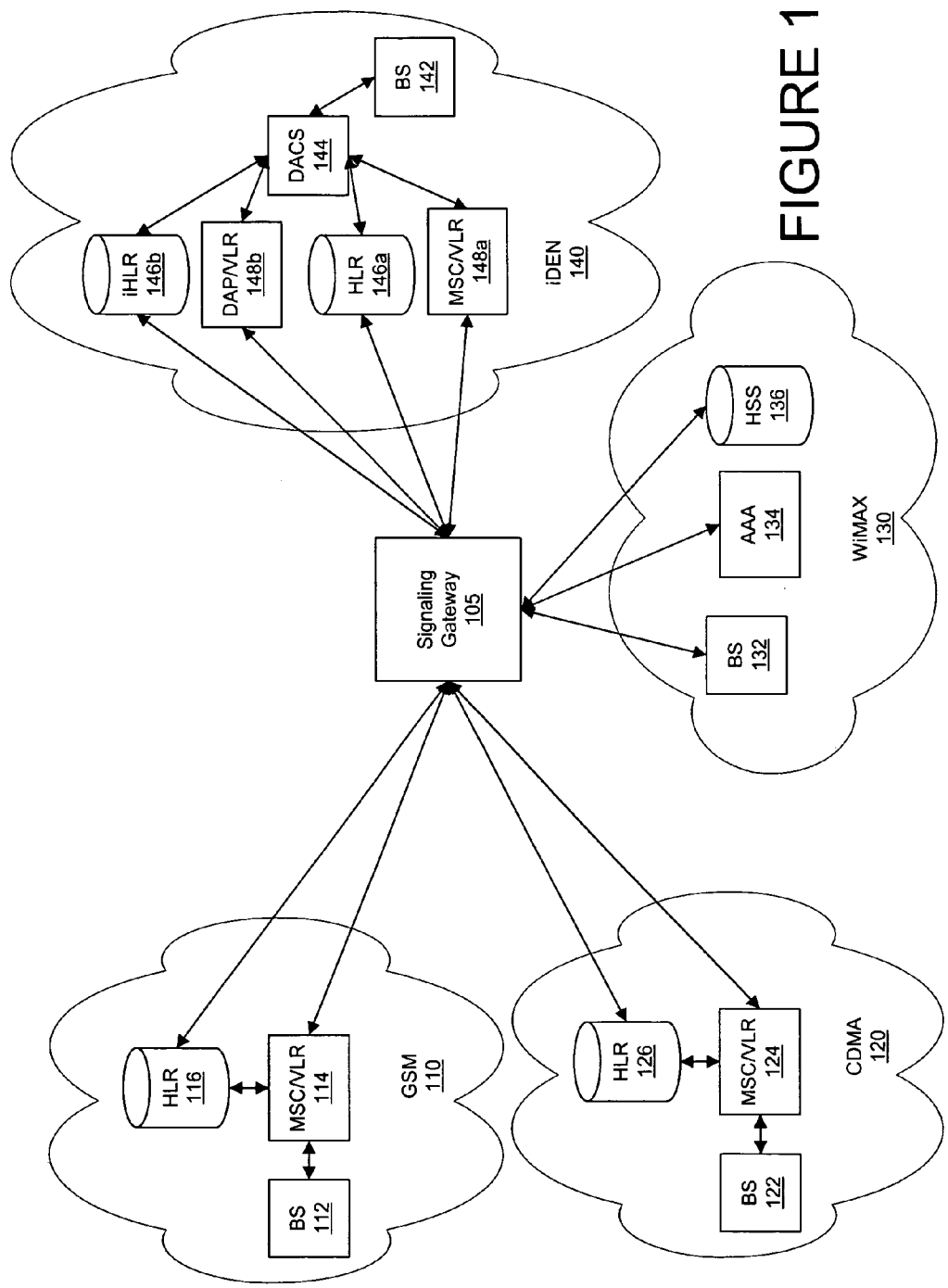
FIG. 1 is a block diagram of an exemplary system in accordance with the present invention.

FIG. 1 is a block diagram of an exemplary system in accordance with the present invention. The system includes signaling gateway 105 coupled to GSM-based network 110, a CDMA-based network 120, a WiMAX-based network 130 and an iDEN-based network 140. Networks 110-140 have their conventional architecture. Specifically, GSM-based network includes one or more base stations 112 coupled to one or more mobile switching centers/visitor location registers (MSC/VLR) 114, which in turn are coupled to a home location register (HLR) 116. Signaling gateway 105 is coupled to one or more MSC/VLRs of the GSM-based network and HLR 116.

CDMA-based network includes one or more base stations 122 coupled to one or more MSC/VLRs 124, which in turn are coupled to a HLR 126. Signaling gateway 105 is coupled to one or more MSC/VLRs of the CDMA-based network and HLR 126.

WiMAX-based network 130 includes one or more base stations 132 which are coupled to authentication, authorization and accounting (AAA) server 134 and home subscriber server 136, all of which are coupled to signaling gateway 105. As will be recognized by those skilled in the art, AAA server performs an authentication process that is typically performed by HLRs 116, 126, 146a and 146b, and HSS 136 performs location tracking typically performed by these HLRs. If desired, AAA 134 and HSS 136 can be combined into a single network element.

iDEN-based network includes one or more base stations 142 coupled to digital access cross-connect switch (DACS) 144. DACS 144 couples base stations to dispatch and interconnect communication services. Specifically, HLR 146a and MSC/VLR 148a provide interconnect communication services and iHLR 146b and dispatch application processor/VLR (DAP/VLR) 148b provide dispatch communication services. HLR 146a, MSC/VLR 148a, iHLR 146b and DAP/VLR 148b are each coupled to signaling gateway 105.

Figure 2:
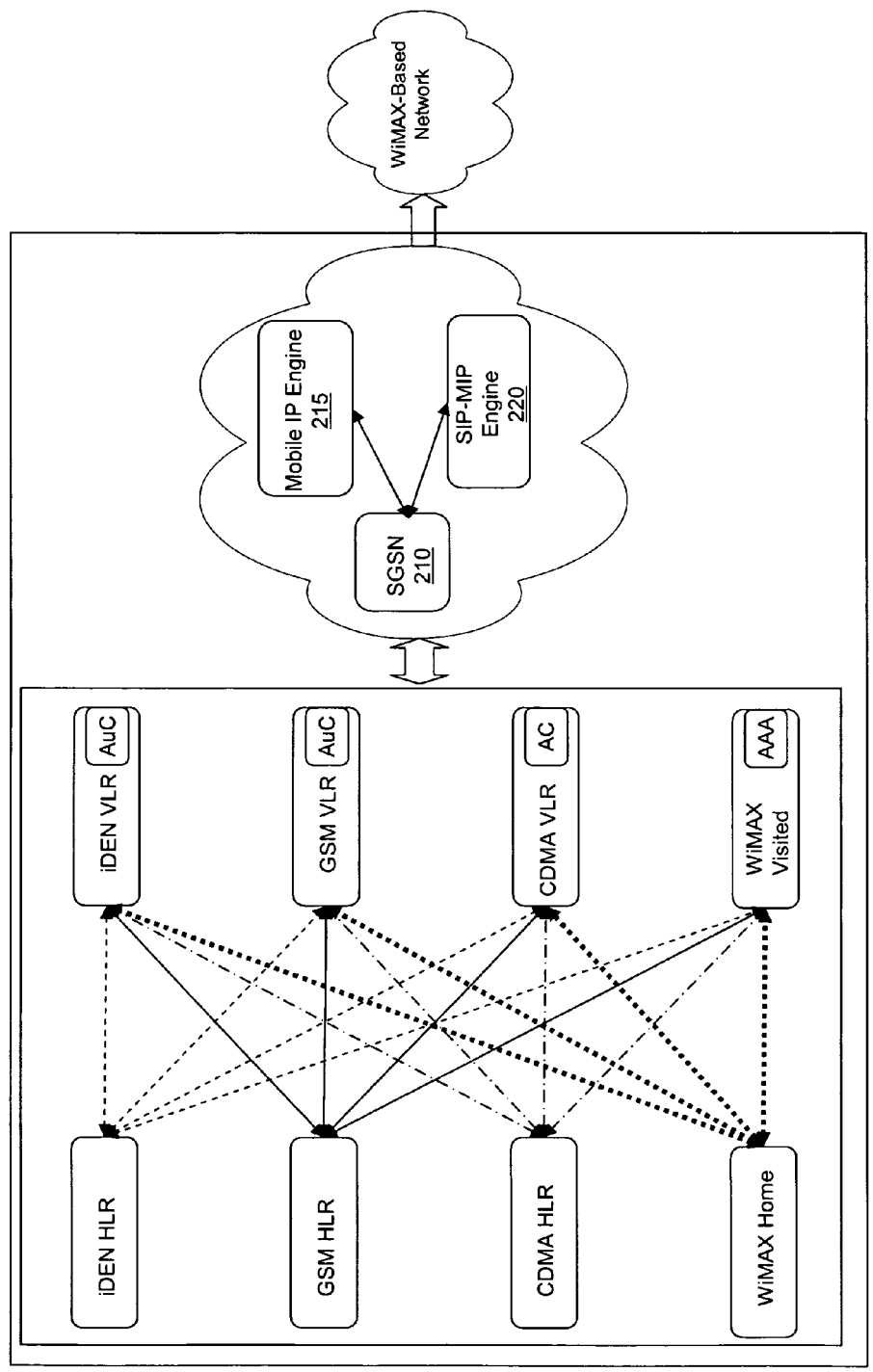
FIG. 2 is a conceptual block diagram of an exemplary signaling gateway in accordance with the present invention.

FIG. 2 is a conceptual block diagram of an exemplary signaling gateway in accordance with the present invention. As illustrated in FIG. 2, signaling gateway 105 provides HLR and VLR functionality for iDEN-based networks, GSM-based networks, CDMA-based network, and corresponding functionality for WiMAX-based networks. The HLR and VLR functionality allow signaling gateway 105 to operate as an HLR for a particular network when a mobile station from that particular network roams into another type of network. For example, when a mobile station that has a subscription with a CDMA-based network roams into a iDEN-based network, the VLR in the iDEN-based network will communicate with signaling gateway 105 as if it were communicating with a HLR in an iDEN-based network and signaling gateway 105 will communicate with the HLR of the CDMA-based network as if it were a VLR in that network.

The different roaming scenarios which can be supported by signaling gateway 105 are provided in the table below:

| | To | | | | | | |
|---|---|---|---|---|---|---|---|
| From | iDEN | GSM | 1xRTT | EVDO (Revs 0, A, B, C, etc.) | WiMAX | GPRS | UMTS/LTE |
| iDEN | | X | X | X | X | X | X |
| GSM | X | | X | X | X | X | X |
| 1xRTT | X | X | | X | X | X | X |
| EVDO (Revs 0, A, B, C, etc.) | X | X | X | | X | X | X |
| WiMAX | X | X | X | X | | X | X |
| GPRS | X | X | X | X | X | | X |
| UMTS/LTE | X | X | X | X | X | X | |

For communication with a WiMAX-based network, signaling gateway 105 is coupled to an Internet Protocol (IP)-based network 205. IP-based network operates in accordance with Internet Multimedia System (IMS) protocols, and includes a Serving GPRS Support Node 210 coupled to mobile IP engine 215 and a session initiation protocol (SIP)-mobile IP (MIP) engine, all of which operate in their conventional manner. Network 205 couples signaling gateway 105 to a WiMAX-based network.

Figure 3:
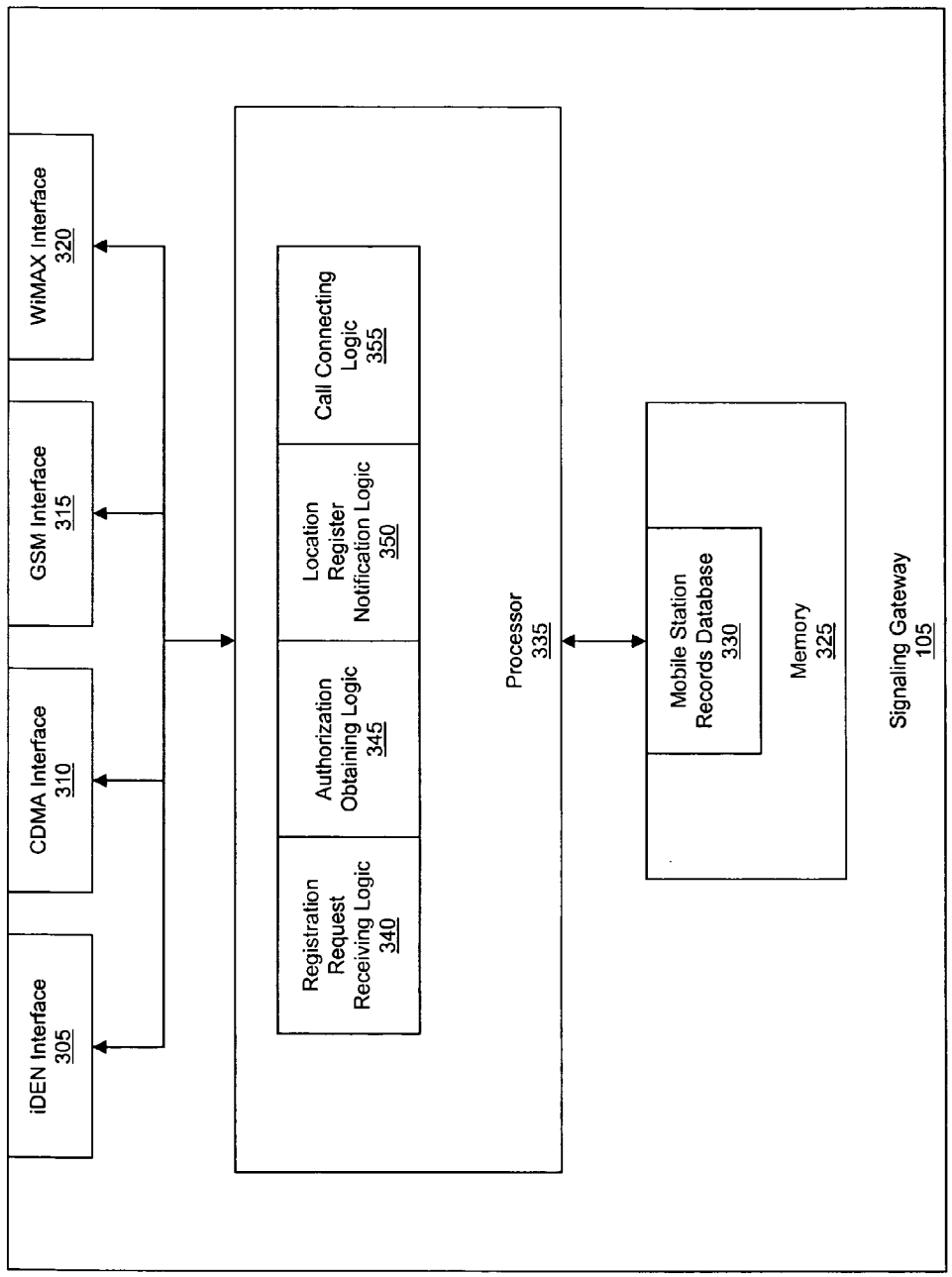
FIG. 3 is a block diagram of an exemplary signaling gateway in accordance with the present invention.

FIG. 3 is a block diagram of an exemplary signaling gateway in accordance with the present invention. Signaling gateway 105 includes network interfaces 305-320 and memory 325 coupled to processor 335. Processor 335 can be any type of processor, such as a microprocessor, field programmable gate array (FPGA), application specific integrated circuit (ASIC) and/or the like. Processor 335 includes logic 340-355, which will be described in more detail below. When processor 335 is a microprocessor, logic 340-355 can be processor executable code loaded from memory 325.

Memory 325 includes a mobile station records database 330, one record of which is illustrated in FIG. 4. Alternatively, an external records database can be employed. As illustrated in FIG. 4, database 330 includes a list of network types that the subscriber may access. The database also includes a list of home databases, which includes home database addresses for the subscriber for each type of network. These home database can include HLRs, AAAs and HSSs. For HLRs the home address can be provided as a SS7 Point Code, and for IP-based servers, such as the AAA and HSS, an IP address is employed. The database also includes a visitor database list that is a dynamic record of the visited network in which the subscriber is currently registered. This list may include HLRs and AAAs, and for the HLRs the address can be provided as an SS7 Point Code and for the AAA as an IP address.

Figure 5:
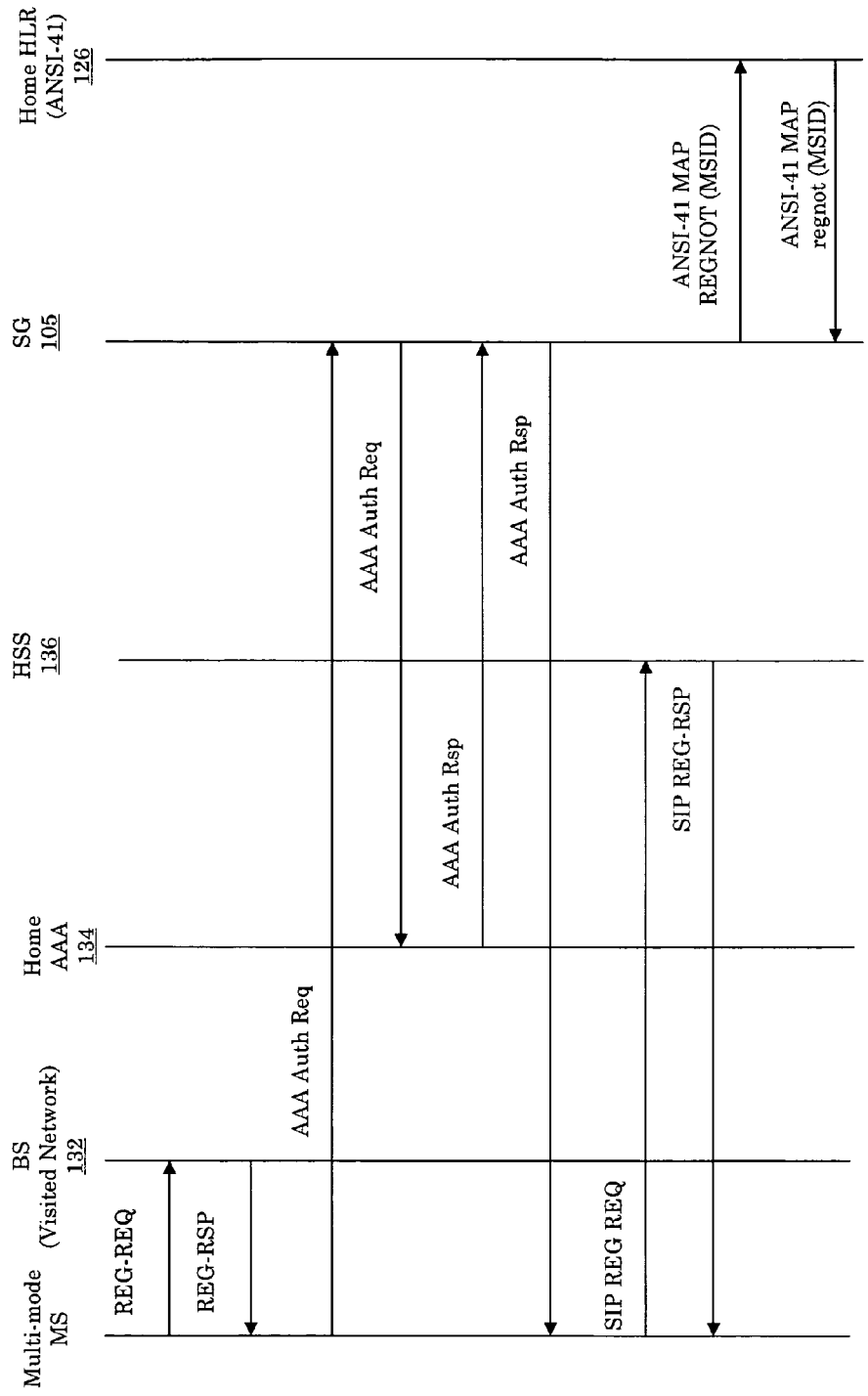
FIG. 5 is an exemplary call flow diagram of a registration procedure for a mobile station that subscribes to a CDMA-based network registering from a WiMAX-based network.

FIG. 5 is an exemplary call flow diagram of a registration procedure for a mobile station that subscribes to a CDMA-based network registering from a WiMAX-based network. A multi-mode mobile station initially sends a registration request message (REG-REQ) to base station 132, which responds with a REG-RSP message. The mobile station then sends a AAA Auth Req message to signaling gateway 105. Logic 340 of signaling gateway 105 receives the message and logic 345 exchanges messages with AAA 134. Specifically, signaling gateway 105 sends a AAA Auth Req message to AAA 134, which responds with a AAA Auth Rsp. Signaling gateway 105 then sends a AAA Auth Rsp message to the mobile station. The mobile station then registers with HSS 136 by sending a SIP REG REQ message, and HSS 136 sends a SIP REG-RSP message.

Signaling gateway 105 accesses mobile station records database 330 to determine the home location register for the mobile station, and logic 350 sends an ANSI-41 MAP REGNOT message with the mobile station's MSID to HLR 126, which responds with an ANSI-41 MAP reqnot message. There are two different techniques for triggering signaling gateway 105 to send the ANSI-41 MAP REGNOT message. In the first technique HSS 136 maintains a timer corresponding to when the SIP REG-RSP message is sent. Upon expiration of this timer, HSS 136 sends signaling gateway 105 a message (e.g., a HS_SG Grant) acknowledging success of the SIP REG-RSP and authorizing the signaling gateway to send the ANSI-41 MAP REGNOT message. By using the timer HSS 136 does not need to keep sending the SIP REG RSP message. Instead, once the timer expires HSS 136 assumes that the successful delivery of the SIP REG-RSP message. The second technique employs a longer timer than the first technique, and this longer timer corresponds to the transmission of the AAA Auth Req message. This technique does not require a message to be sent from HSS 136 to signaling gateway 105. When the timer for the AAA Auth Req message expires, signaling gateway 105 sends the ANSI_MAP REGNOT message.

Figure 6:
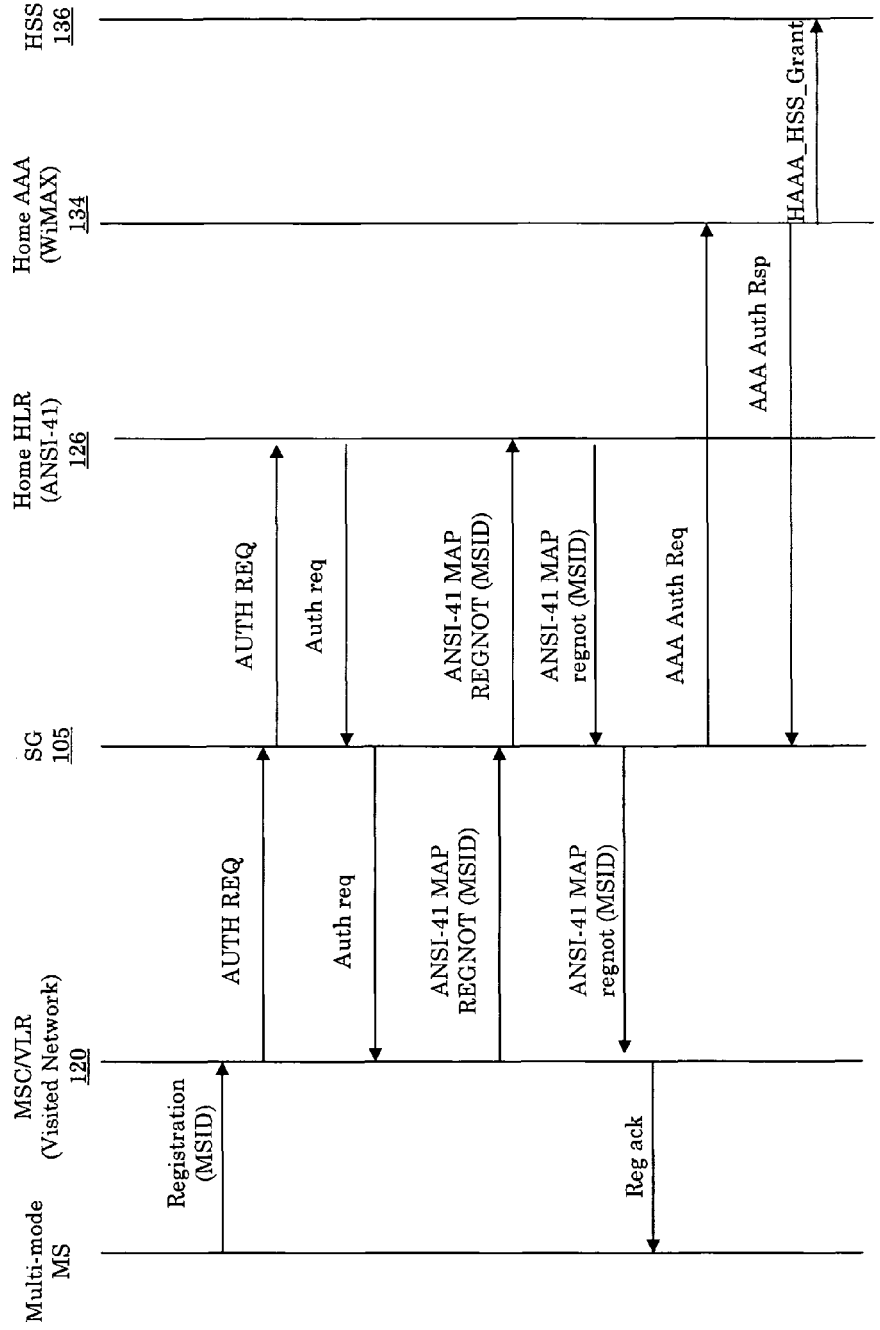
FIG. 6 is an exemplary call flow diagram of a registration procedure for a mobile station that subscribes to a WiMAX-based network registering from a CDMA-based network.

FIG. 6 is an exemplary call flow diagram of a registration procedure for a mobile station that subscribes to a WiMAX-based network registering from a CDMA-based network. A multi-mode mobile station initially sends a registration request message with its MSID to MSC/VLR 120, which in turn sends an AUTH REQ message to signaling gateway 105. Logic 340 receives this message and logic 345 sends an AUTH REQ message to HLR 126. HLR 126 responds with an Auth req message, which is forwarded by signaling gateway 105 to MSC/VLR 120. MSC/VLR 120 then sends an ANSI-41 MAP REGNOT message to signaling gateway 105. Logic 340 receives this message and logic 350 forwards this message to HLR 126. HLR 126 responds with an ANSI-41 MAP regnot message, and signaling gateway 105 forwards this message to MSC/VLR 120. MSC/VLR 120 then sends a Reg ack message to the mobile station. Signaling gateway 105 accesses the mobile station records database 330 to determine the home location and authorization registers for the mobile station, and then logic 345 of signaling gateway 105 sends a AAA Auth Req message to AAA 134, which responds with a AAA Auth Rsp message. AAA 134 then sends a HAAA_HSS_Grant message to HSS 136 to update the mobile station's current location.

Figure 7:
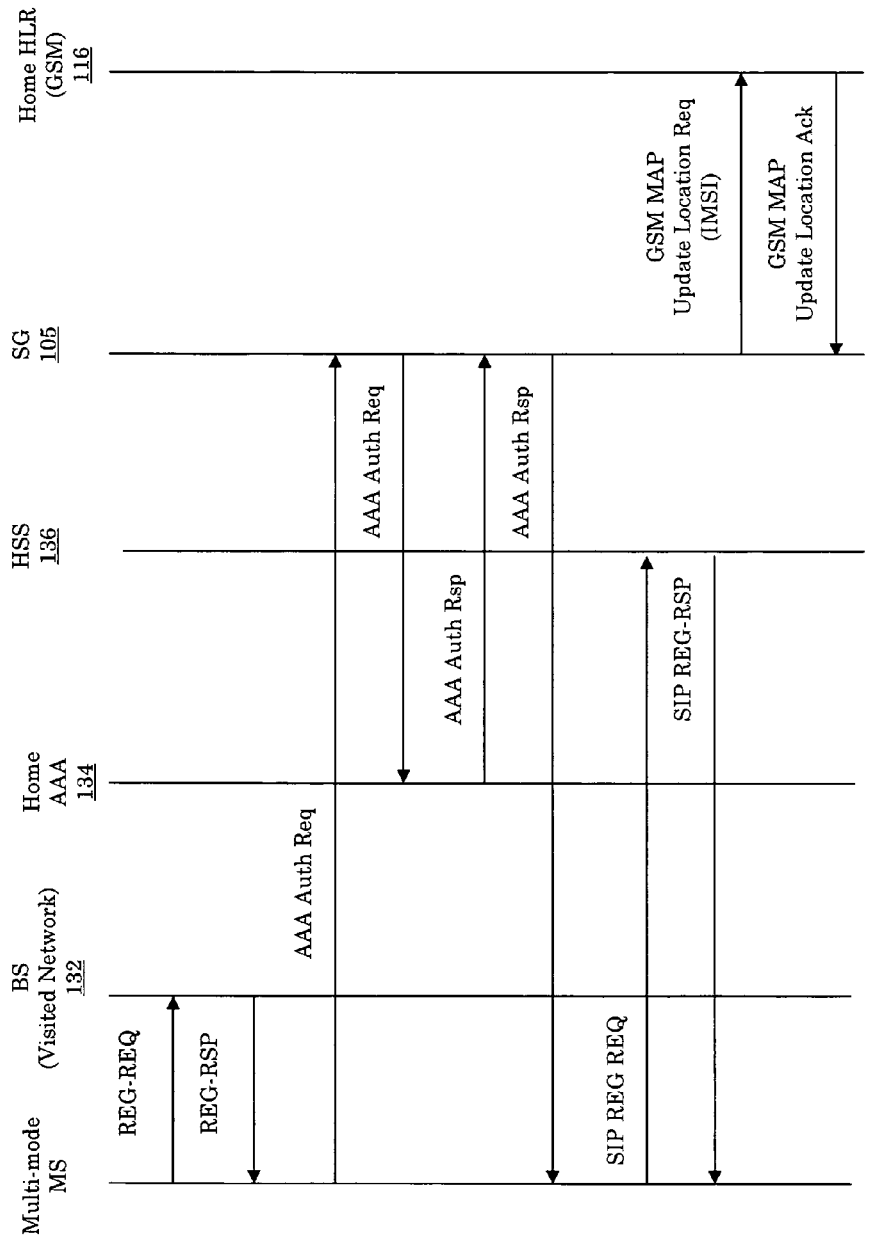
FIG. 7 is an exemplary call flow diagram of a registration procedure for a mobile station that subscribes to a GSM-based network registering from a WiMAX-based network.

FIG. 7 is an exemplary call flow diagram of a registration procedure for a mobile station that subscribes to a GSM-based network registering from a WiMAX-based network. Initially, a mobile station sends a REG-REQ message to base station 132, which responds with a REG-RSP message. The mobile station then sends a AAA Auth Req message to signaling gateway 105. Logic 340 receives this message and logic 345 sends a AAA Auth Req message to AAA 134, which responds with a AAA Auth Rsp message. Signaling gateway 105 then sends a AAA Auth Rsp message to the mobile station. The mobile station then sends a SIP REG REQ message to HSS 136, which responds with a SIP REG-RSP message. Signaling gateway 105 accesses mobile station records database 330 to determine the home location register for the mobile station, and logic 350 of signaling gateway 105 then sends a GSM MAP Update Location Req message to HLR 116, which responds with a GSM MAP Update Location Ack message. Either of the two techniques described above in connection with FIG. 5 can be employed for signaling gateway 105 to send the GSM MAP Update Location Req message.

Figure 8:
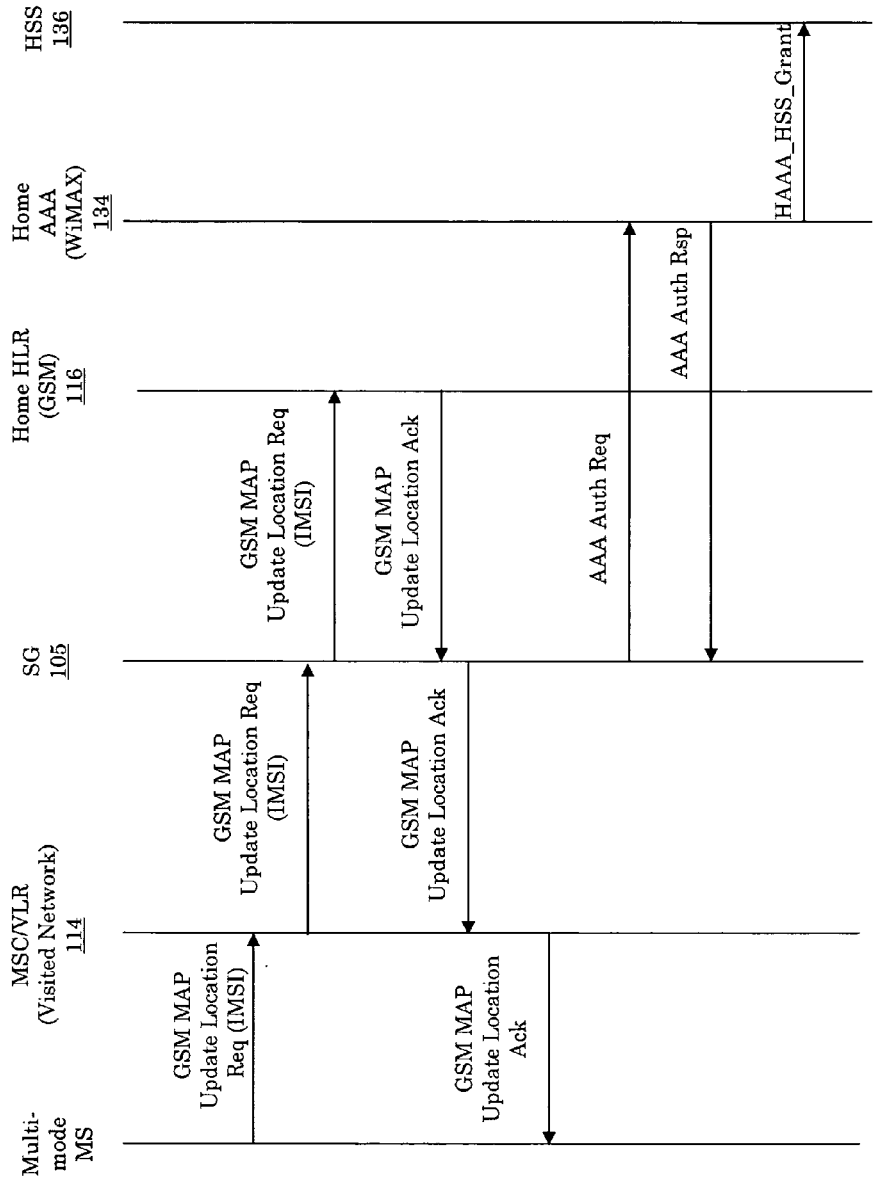
FIG. 8 is an exemplary call flow diagram of a registration procedure for a mobile station that subscribes to a WiMAX-based network registering from a GSM-based network.

FIG. 8 is an exemplary call flow diagram of a registration procedure for a mobile station that subscribes to a WiMAX-based network registering from a GSM-based network. The mobile station initially sends a GSM MAP Update Location Req message to MSC/VLR 114, which forwards this message to signaling gateway 105. Logic 340 of signaling gateway 105 receives this message and logic 345 forwards the message to HLR 116. HLR 116 responds with a GSM MAP Update Location Ack message, which is forwarded by signaling gateway 105 to MSC/VLR 114. MSC/VLR then forwards this message to the mobile station. Signaling gateway 105 accesses mobile station records database 330 to determine the home location and authentication registers for the mobile station, and logic 345 then sends a AAA Auth Req message to AAA 134, which responds with a AAA Auth Rsp. AAA 134 then sends a HAAA_HSS_Grant message to HSS 136 to update the mobile station's current location.

Figure 9:
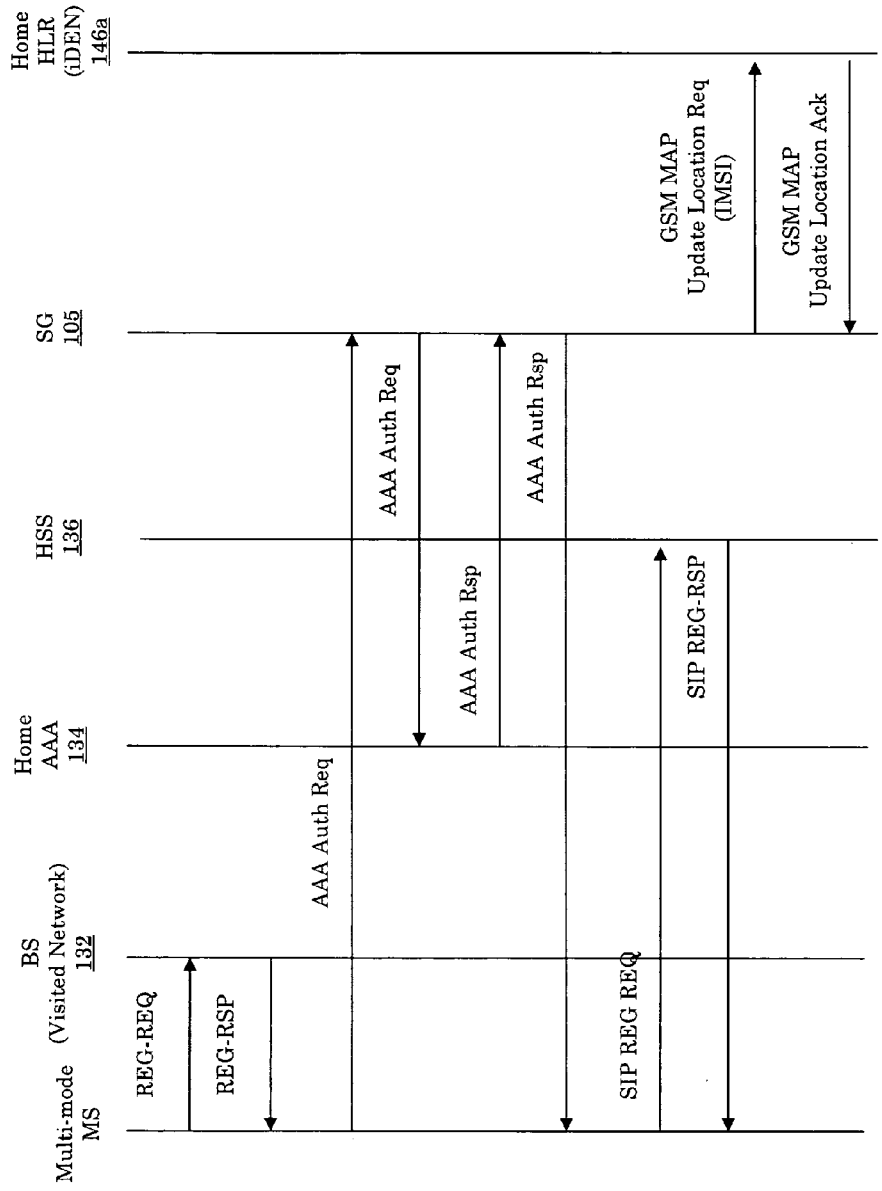
FIG. 9 is an exemplary call flow diagram of a registration procedure for a mobile station that subscribes to an iDEN-based network registering from a WiMAX-based network.
Figure 10:
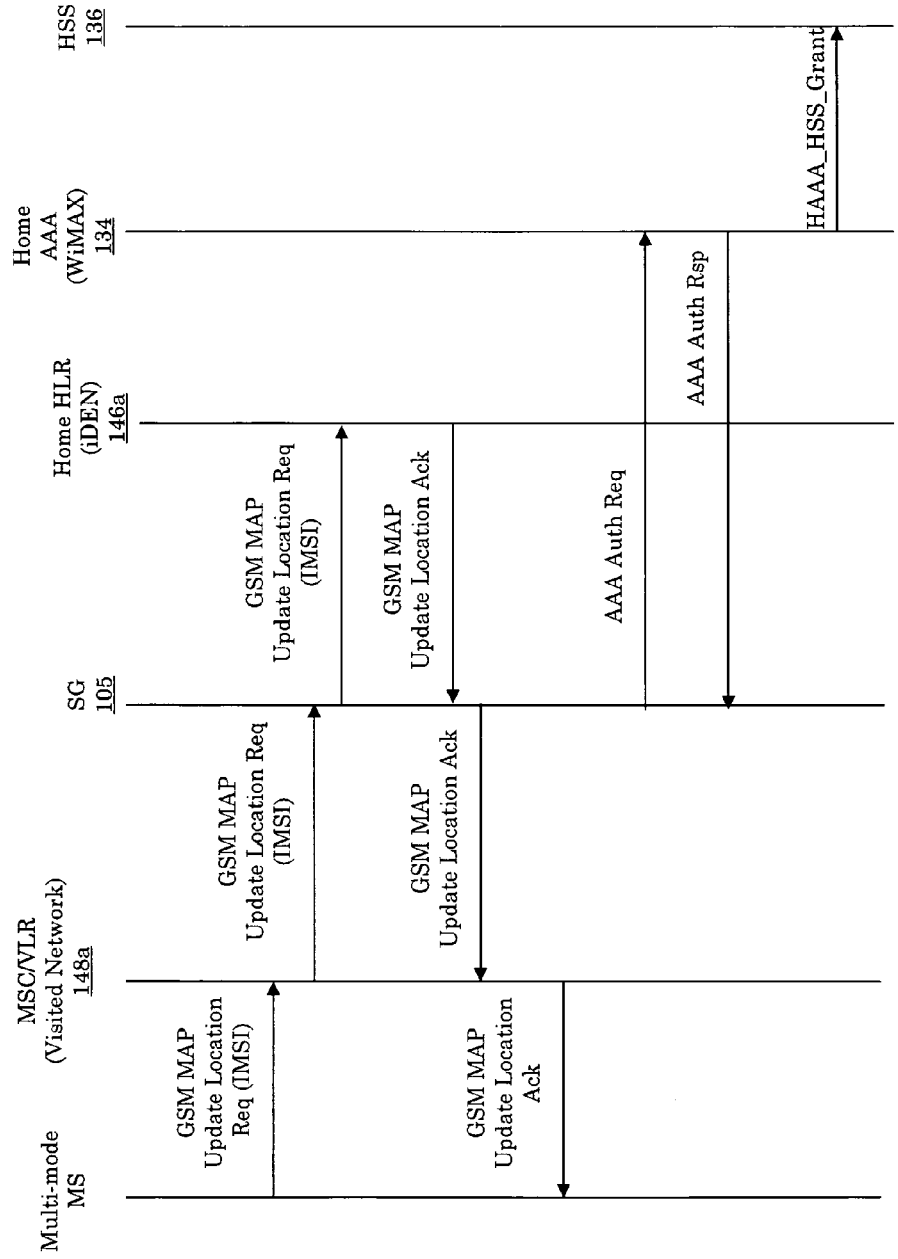
FIG. 10 is an exemplary call flow diagram of a registration procedure for a mobile station that subscribes to a WiMAX-based network registering from an iDEN-based network.

FIG. 9 is an exemplary call flow diagram of a registration procedure for a mobile station that subscribes to an iDEN-based network registering from a WiMAX-based network, and FIG. 10 is an exemplary call flow diagram of a registration procedure for a mobile station that subscribes to a WiMAX-based network registering from an iDEN-based network. Because call signaling for interconnect voice calls in iDEN-based networks is the same as that for GSM-based networks, the signaling in FIGS. 9 and 10 are the same as that of FIGS. 7 and 8. Similar call flows will occur for registration for dispatch communication services.

Figure 11:
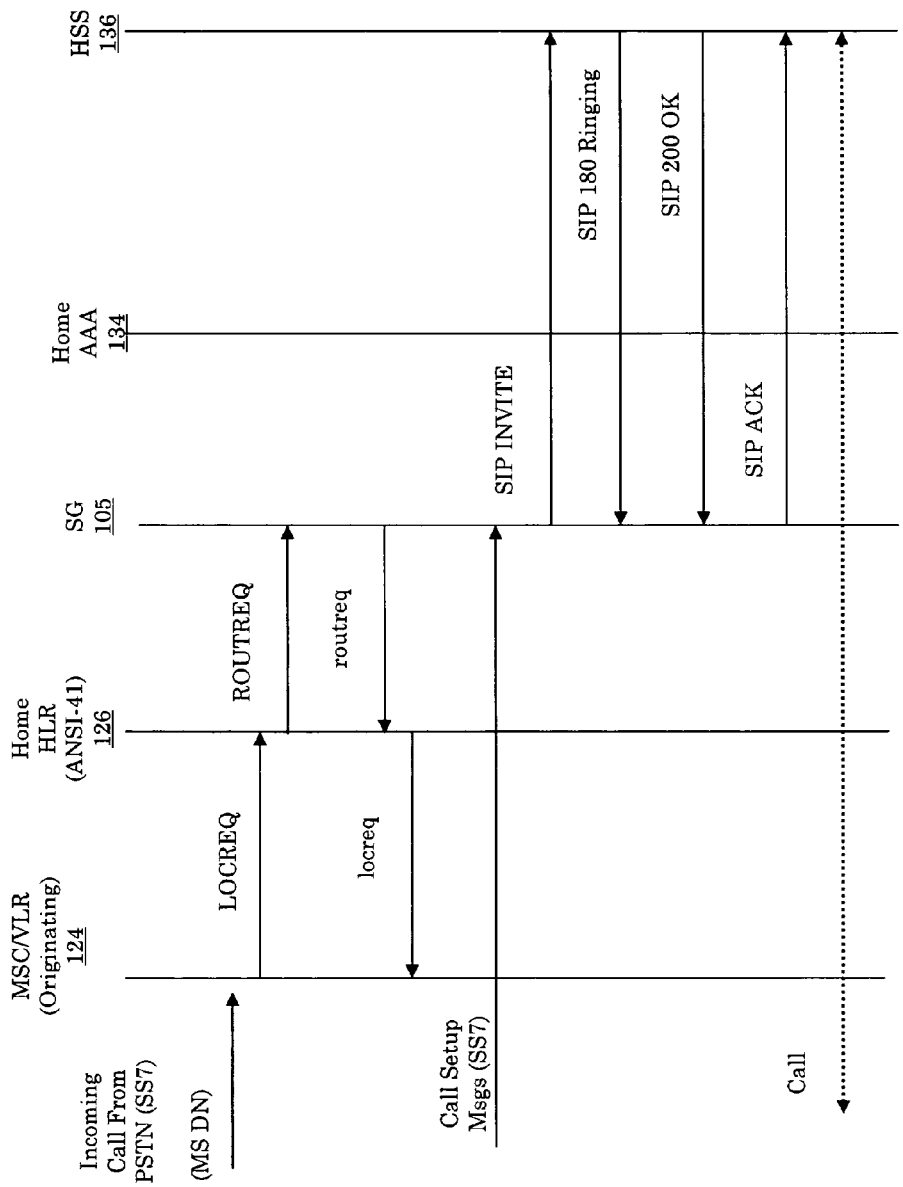
FIG. 11 is an exemplary call flow diagram of a call setup procedure for a call that arrives at a CDMA-based network for a mobile station supported by a WiMAX-based network.

FIG. 11 is an exemplary call flow diagram of a call setup procedure for a call that arrives at a CDMA-based network for a mobile station supported by a WiMAX-based network. When a call from a public switched telephone network (PSTN) arrives at MSC/VLR 124, a LOCREQ message is sent to HLR 126 to determine the current location of the mobile station. HLR 126 examines a subscriber record for the mobile station destination number and determines that the mobile station is "located" at signaling gateway 105. Logic 355 of signaling gateway 105 examines a subscriber record in database 330 and provides the mobile station's current location in a routreq message. HLR 126 then sends a locreq message to MSC/VLR 124. A SS7 Call Setup message is then sent to signaling gateway 105, and logic 355 then sends a SIP INVITE message to HSS 136. HSS 136 responds with a SIP 180 Ringing message, and once the destination mobile station has been connected to the call, sends a SIP 200 OK message. Logic 355 of signaling gateway 105 responds with a SIP ACK message and then the call is setup between the caller and the destination mobile station.

Figure 12:
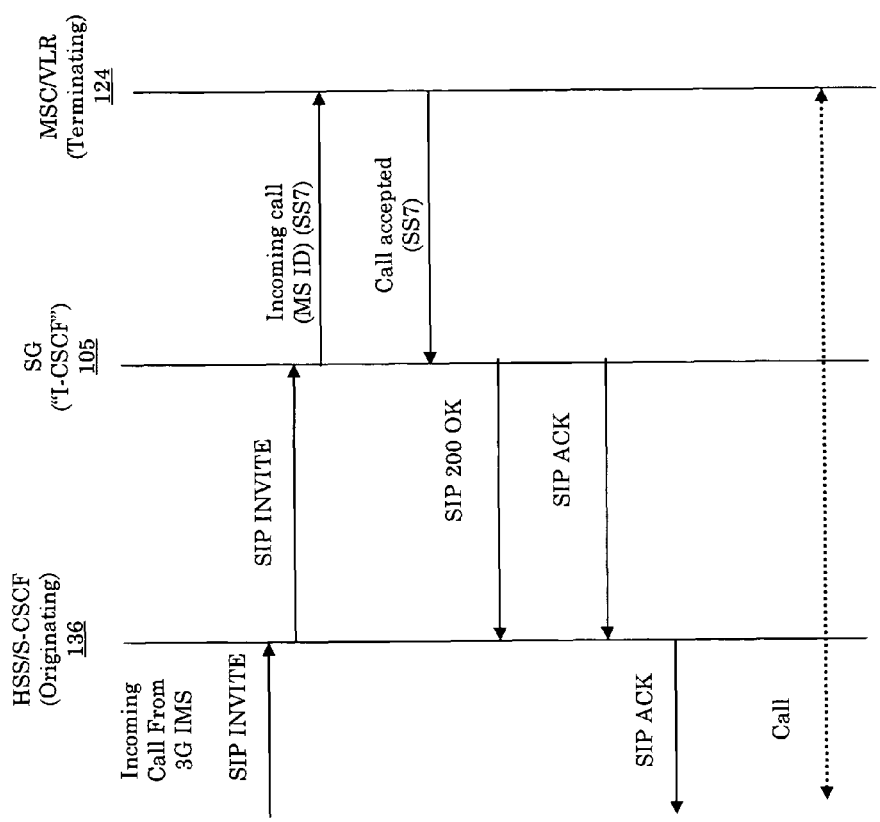
FIG. 12 is an exemplary call flow diagram of a call setup procedure for a call that arrives at a WiMAX-based network for a mobile station supported by a CDMA-based network.

FIG. 12 is an exemplary call flow diagram of a call setup procedure for a call that arrives at a WiMAX-based network for a mobile station supported by a CDMA-based network. When a call from a IMS network is received by HSS 136, HSS 136 sends a SIP INVITE Message to signaling gateway 105. Logic 355 of signaling gateway 105 accesses a record of the mobile station in database 330 and determines that the destination mobile station is currently supported by MSC/VLR 124. Accordingly, logic 355 of signaling gateway 105 sends an Incoming call SS7 message to MSC/VLR 124, which when the destination mobile station is connected sends a Call Accepted SS7 message. Logic 355 of signaling gateway 105 sends a SIP 200 OK message and then a SIP ACK message to HSS 136. HSS 136 forwards the SIP ACK message to the originating communication station and then a call is connected between the originating communication station and the destination mobile station.

Although call flow diagrams have been described in connection with particular registration and call setup scenarios, the present invention is equally applicable to all registration and call setup scenarios that are possible as outlined in the table above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for registering a mobile station using a signaling gateway, the method comprising the acts of: receiving a registration request for the mobile station at a first wireless network; receiving an authorization request from the mobile station at the signaling gateway; forwarding the authorization request from the signaling gateway to an authorization element of the first wireless network; obtaining an authorization for the mobile station from an authorization element of the first wireless network; and forwarding from the signaling gateway a registration notification to a location register of the first wireless network; determining, at the signaling gateway, a home wireless network for the mobile station, wherein the home wireless network is selected from one of either a second wireless network or a third wireless network; forwarding the authorization request from the signaling gateway to an authorization element of the home wireless network; obtaining an authorization for the mobile station from the authorization element of the home wireless network; receiving at the signaling gateway a call request for the mobile station from a location register of the home wireless network; and transmitting from the signaling gateway a call request for the mobile station to the location register of the first wireless network, wherein the first wireless network operates in accordance with a WiMAX protocol and the transmitted call request is a session initiation protocol (SIP) Invite message, the method further comprising the acts of: receiving at the signaling gateway a SIP 180 ringing message from the location register of the first wireless network; receiving at the signaling gateway a SIP 200 OK message from the location register of the first wireless network; and transmitting from the signaling gateway a SIP ACK message to the location register of the first wireless network.

2. The method of claim 1, wherein the home wireless network operates in accordance with an ANSI-41 protocol and the authorization element and the location register of the home wireless network is a home location register.

3. The method of claim 1, wherein the home wireless network operates in accordance with a GSM protocol and the authorization element and the location register of the home wireless network is a home location register.

4. The method of claim 1, wherein the home wireless network operates in accordance with an iDEN protocol and the authorization element and the location register of the home wireless network is a home location register.

5. The method of claim 1, wherein the first wireless network operates in accordance with a WiMAX, protocol, and the authorization element is an authentication, authorization and accounting (AAA) server.

6. A signaling gateway, comprising: a first interface to a first wireless network that operates according to a first communication protocol; a second interface to a second wireless network that operates according to a second communication protocol; a third interface to a third wireless network that operates according to a third communication protocol;

and a processor coupled to the first, second, and third interfaces, the processor comprising: logic for receiving a registration request from a mobile station supported by a first wireless network; logic for obtaining an authorization for the mobile station from an authorization element of the first wireless network; logic for forwarding a registration notification to a location register of the first wireless network; logic for determining a home wireless network for the mobile station, wherein the home wireless network is selected from one of either the second wireless network or the third wireless network; logic for obtaining an authorization for the mobile station from an authorization element of the home wireless network; and logic for notifying a location register in the home wireless network of a current location of the mobile station, wherein the processor forwards an authorization request to an authorization element of the first wireless network, and forwards from the signaling gateway a registration notification to a location register of the first wireless network; determines that one of the second and third wireless networks is a home wireless network for the mobile station, wherein the home wireless network is selected from one of either a second wireless network or a third wireless network, forwards an authorization request from the signaling gateway to an authorization element of the home wireless network, obtains the authorization for the mobile station from the authorization element of the home wireless network, receives at the signaling gateway a call request for the mobile station from a location register of the home wireless network, and transmits from the signaling gateway a call request for the mobile station to the location register of the first wireless network, wherein the first wireless communication network operates in accordance with a WiMAX or LTE protocol and the transmitted call request is a session initiation protocol (SIP) Invite message.

7. The signaling gateway of claim 6, further comprising a memory, coupled to the processor, wherein the memory includes processor executable code that when loaded into the processor comprises the logic.

8. The signaling gateway of claim 6, wherein the first wireless network operates in accordance with a WiMAX, protocol, and the authorization element of the first wireless network is an authentication, authorization and accounting (AAA) server.

9. The signaling gateway of claim 8, wherein the location register of the home wireless network is a home location register.

10. The signaling gateway of claim 9, wherein the home wireless network operates in accordance with an ANSI-41 protocol.

11. The signaling gateway of claim 9, wherein the home wireless network operates in accordance with a GSM protocol.

12. The signaling gateway of claim 9, wherein the home wireless network operates in accordance with an iDEN protocol.

13. The signaling gateway of claim 6, wherein the logic for obtaining the authorization for the mobile station from the authorization element of the first wireless network comprises:
    logic for obtaining an authorization for the mobile station from an authorization element of the second wireless network or third wireless network.

14. A method for registering a mobile station using a signaling gateway, the method comprising the acts of: receiving a registration request for the mobile station at a first wireless network; receiving an authorization request from the mobile station at the signaling gateway; forwarding the authorization request from the signaling gateway to an authorization element of the first wireless network; obtaining an authorization for the mobile station from an authorization element of the first wireless network; and forwarding from the signaling gateway a registration notification to a location register of the first wireless network; determining, at the signaling gateway, a home wireless network for the mobile station, wherein the home wireless network is selected from one of either a second wireless network or a third wireless network; forwarding the authorization request from the signaling gateway to an authorization element of the home wireless network; obtaining an authorization for the mobile station from the authorization element of the home wireless network, receiving at the signaling gateway a call request for the mobile station from a location register of the home wireless network; and transmitting from the signaling gateway a call request for the mobile station to the location register of the first wireless network, wherein the first wireless communication network operates in accordance with an LTE protocol and the transmitted call request is a session initiation protocol (SIP) Invite message.

* * * * *